United States Patent [19]

Furuya et al.

[11] Patent Number: 5,398,039
[45] Date of Patent: Mar. 14, 1995

[54] DISPLAYING APPARATUS FOR VEHICLE

[75] Inventors: Yoshiyuki Furuya; Kunimitsu Aoki, both of Shizuoka, Japan

[73] Assignee: Yazaki Corporation, Tokyo, Japan

[21] Appl. No.: 8,284

[22] Filed: Jan. 25, 1993

[30] Foreign Application Priority Data

Feb. 10, 1992 [JP] Japan ............................ 4-004868 U

[51] Int. Cl.⁶ ............................................. G09G 3/02
[52] U.S. Cl. ........................................ 345/7; 359/630
[58] Field of Search ................ 340/705, 980; 359/630, 359/613, 614, 609, 633; 358/103, 104; 345/7, 8; 348/115

[56] References Cited

U.S. PATENT DOCUMENTS

| 2,750,833 | 6/1956 | Gross. | |
|---|---|---|---|
| 3,620,592 | 11/1971 | Freeman. | |
| 4,986,631 | 1/1991 | Aoki et al.. | |
| 5,181,012 | 1/1993 | Fucuya et al. | 340/705 |
| 5,229,754 | 7/1993 | Aoki et al. | 340/705 |
| 5,231,379 | 7/1993 | Wood et al. | 340/705 |

FOREIGN PATENT DOCUMENTS

| 3225362 | 1/1984 | Germany. |
| 4104233 | 8/1991 | Germany. |
| 6231531 | 2/1987 | Japan. |
| 275332 | 6/1990 | Japan. |
| 281226 | 6/1990 | Japan. |
| 4181283 | 6/1992 | Japan. |

Primary Examiner—Ulysses Weldon
Assistant Examiner—Regina Liang
Attorney, Agent, or Firm—Sughrue, Mion, Zinn, Macpeak & Seas

[57] ABSTRACT

The present invention is concerned with a displaying apparatus for a vehicle which assures that a displayed image for displaying informations on the present running state of the vehicle such as a running speed or the like in the form of a virtual image by reflecting the displayed image on the displaying unit to an eye range on the driver's seat with the aid of a first reflective plate, and its object resides in providing a displaying apparatus of the foregoing type which assures that quality of the displayed image can be improved with inexpensive construction, and moreover, visual recognizability of the displaying apparatus can be improved (with improved optical contrast). According to the present invention, a surface glass disposed on a displaying unit adapted to allow displaying light beam from a second reflective plate to permeate through a first reflective plate is inclined in such a manner that a virtual image (ghost) identical with a displayed image built by the first reflective plate and the second reflective plate is located outside of a visual recognizable area.

4 Claims, 4 Drawing Sheets

5,398,039

DISPLAYING APPARATUS FOR VEHICLE

BACKGROUND OF THE INVENTION

The present invention relates to a displaying apparatus for a vehicle which assures that the displayed image for displaying informations on the present running state of the vehicle such as a running speed or the like is visually recognized by a driver by reflecting the displayed image appearing on the screen of a displaying unit to an eye range disposed on the driver's seat side.

A displaying apparatus for a vehicle for displaying a displayed image on the screen of a displaying unit from a remote location by utilizing a reflective plate so as to increase a visual recognizing speed with the vehicle has been hitherto known.

The foregoing type of displaying apparatus for a vehicle as mentioned above shows an excellent effect for displaying a certain displayed image from a remote location as the length of light beam path for allowing light beam to pass along the light beam path via reflection is elongated more and more. In view of the foregoing fact, proposals have been made with respect to a displaying apparatus of the foregoing type wherein the whole displaying apparatus is compactly designed with a reduced space to be occupied by the reflected light beam path, and moreover, the total length of light beam path is elongated.

FIG. 4 is a side view of a conventional displaying apparatus for a vehicle which schematically shows by way of example the structure of the apparatus.

In FIG. 4, reference numeral 11 designates a meter hood portion of a dashboard, reference numeral 21 designates a self-illuminating type displaying unit such as a liquid crystal displaying unit, a fluorescent displaying tube or the like disposed in the dashboard to display informations on the present running state of the vehicle such as a running speed or the like, reference numeral 21a designates a surface glass disposed on the displaying surface side (displaying light beam emitting side) of the displaying unit 21, and reference numeral 31 designates a first reflective plate having light permeability disposed on the displaying surface side of the displaying unit 21. The first reflective plate 31 is molded of a transparent acrylic resin having, e.g., a smoked/darkened color.

Reference numeral 41 designates a second reflective plate which is located opposite to the displaying unit 21 with the first reflective plate 31 being interposed therebetween. The second reflective plate 41 serves to fully reflect the displaying light beam to the first reflective plate 31.

Reference numeral 51 designates an eye range which is disposed on the driver's seat side so as to allow a displayed image on the displaying unit 21 to be visually recognized by a driver, reference numeral 51U designates an upper limit of the eye range 51 from which the lower end of the second reflective plate 41 appearing on the first reflective plate 31 can be seen, reference numeral 51C designates a center of the eye range 51, and reference numeral 51D designates a lower end of the eye range 51 from which the upper end of the second reflective plate 41 appearing on the first reflective plate 31 can be seen.

Reference character $A_S$ designates a visually recognizable area. The visually recognizable area $A_S$ is defined by a first line $L_1$ extending between the upper limit 51U of the eye range 51 and the lower end of the second reflective plate 41 appearing on the first reflective plate 31, a second line $L_2$ extending between the lower limit 51D of the eye range 51 and the upper end of the second reflective plate 41 appearing on the first reflective plate 31, and the second reflective plate 41 appearing on the first reflective plate 31.

Reference character $A_{S1}$ designates a visual recognizable area. The visually recognizable area $A_{S1}$ corresponds to the visual recognizable area $A_S$ of the second reflective plate 41.

Reference characters X and $X_1$ designate displayed images. The displayed image X is visually recognized by a driver from the eye range 51 at the position located behind the first reflective plate 31, and the displayed image $X_1$ is coincident with the displayed image X appearing on the first reflective plate 31.

Reference characters $X_{11}$ to $X_{13}$ designate ghosts (virtual images) which are derived from a surface glass 21a on the displaying unit 21, the first reflective plate 31 and the second reflective plate 41.

Reference characters 32a and 32b designate light masking members which are disposed on the displaying unit 21 side of the first reflective plate 31. The light masking members 32a an 32b serve to mask the first reflective plate 31 therewith with the exception of a range $A_0$ where displaying light beam of the displaying unit 21 is directed to the second reflective plate 41, whereby the displaying unit 21 can not visually be seen from the eye range 51 by any means.

Next, a mode of operation of the conventional displaying apparatus constructed in the aforementioned manner will be described below.

First, displaying light beam emitted from the displaying unit 21 to display a displayed image passes through the first reflective plate 31, and subsequently, it is reflected at the second reflective plate 41.

The reflected light beam fully reflected at the second reflective plate 41 is reflected again to the eye range 51 via the first reflective plate 31.

With such construction, when the first reflective plate 31 is seen from the eye range 51, the displayed image X is visually recognized by a driver as a virtual image in the visual recognizable area $A_S$ located behind the first reflective plate 31.

Since the displayed image X visually recognized in that way is displayed at the remote position corresponding to a length of light beam path within the range defined by the second reflective plate 41 appearing on the first reflective plate 31, image displaying can be achieved with excellent visual recognizability.

Since the conventional displaying apparatus for a vehicle is constructed in the above-described manner, a part of the displaying light beam reflected from the second reflective plate 41 to the first reflective plate 31 permeates through the first reflective plate 31 again so that it is irradiated to the surface glass 21a of the displaying unit 21. Thus, the displayed image $X_1$ is transformed into a virtual image $X_{11}$ due to reflection at the surface glass 21a.

Subsequently, the virtual image $X_{11}$ is reflected at the second reflective plate 41 in the enlarged state to become a virtual image $X_{12}$ which in turn is reflected at the first reflective plate 31, causing a virtual image $X_{13}$ to be located in the visual recognizable area $A_S$.

Consequently, as shown in FIG. 5, since the virtual image (ghost) $X_{13}$ is visually recognized together with the displayed image X from the eye range 51 in the visual recognizing area $A_S$, there arise malfunctions that display quality-of the displayed image X is reduced, and moreover, visual recognizability of the displaying apparatus is degraded (with reduced optical contrast).

Although the virtual image $X_{13}$ can be located at the visual recognizing area $A_S$ by reducing the light permeability of the first reflective plate 31, there arise another malfunctions that the displaying unit 21 is illuminated with reduced brightness and an efficiency of the displaying apparatus is reduced, resulting in the displaying apparatus being fabricated at an expensive cost because of a necessity for improving the brightness of the displaying unit 21.

In addition, another malfunction is that when the displaying unit 21 is displaced in the upward direction in order to design the displaying apparatus with smaller vertical dimensions, the displaying unit 21 can unavoidably be seen from the eye range 51.

SUMMARY OF THE INVENTION

The present invention has been made in consideration of the aforementioned malfunctions to be obviated and its object resides in providing a displaying apparatus for a vehicle which assures that display quality of a displayed image can be improved with an inexpensive structure, visual recognizability of the displaying apparatus can be improved (with improved contrast), and a display unit can not be seen from an eye range by any means.

According to one aspect of the present invention, there is provided a displaying apparatus for a vehicle wherein the displaying light beam emitted from a displaying unit to permeate through a first reflective plate having light permeability is reflected to the first reflective plate via a second reflective plate, and subsequently, the reflected light beam from the second reflective plate is reflected to an eye range via the first reflective plate, whereby the displayed image appearing on the displaying unit in the form of a virtual image is visually recognized as a virtual image on the first reflective plate as seen from the eye range, wherein the displaying apparatus has a surface glass disposed on the displaying unit adapted to allow the displaying light beam to permeate through the first reflective plate is inclined in such a manner that a ghost identical with the displayed image built by the first reflective plate and the second reflective plate is located outside of a visual recognizable area defined by a first line extending between the upper limit of the eye range and the lower end of the second reflective plate appearing on the first reflective plate, a second line extending between the lower limit of the eye range and the upper end of the second reflective plate appearing on the first reflective plate, and the second reflective plate appearing on the first reflective plate.

Further, according to other aspect of the present invention, there is provided a displaying apparatus for a vehicle wherein the displaying light beam emitted from a displaying unit to permeate through a first reflective plate having light permeability is reflected to the first reflective plate via a second reflective plate, and subsequently, the reflected light beam from the second reflective plate is reflected to an eye range via the first reflective plate, whereby the displayed image appearing on the displaying unit in the form of a virtual image is visually recognized as a virtual image on the first reflective plate as seen from the eye range, and wherein light masking members are arranged on the surface of the first reflective plate located on the displaying unit side with the exception of the range where the displaying light beam from the displaying unit is directed to the second reflective plate, wherein the displaying apparatus has a surface glass disposed on the displaying unit adapted to allow the displaying light beam to permeate through the first reflective plate is inclined in such a manner that a ghost identical with the displayed image built by the first reflective plate and the second reflective plate is located outside of a visual recognizable area defined by a first line extending between the upper limit of the eye range and the lower end of the second reflective plate appearing on the first reflective plate, a second line extending between the lower limit of the eye range and the upper end of the second reflective plate appearing on the first reflective plate, and the second reflective plate appearing on the first reflective plate, and that the displaying unit is arranged below a third line extending between the upper limit of the eye range and the lower side of the aforementioned range.

With the displaying apparatus for a vehicle constructed according to the present invention, even when the ghost of the displayed image is not located in the visual recognizable area, the displaying unit can not be seen from the eye range by any means.

DETAILED DESCRIPTION OF THE PREFERRED EMBODIMENTS

The present invention will now be described in detail hereinafter with reference to the accompanying drawings which illustrate a preferred embodiment thereof.

Figure 1:
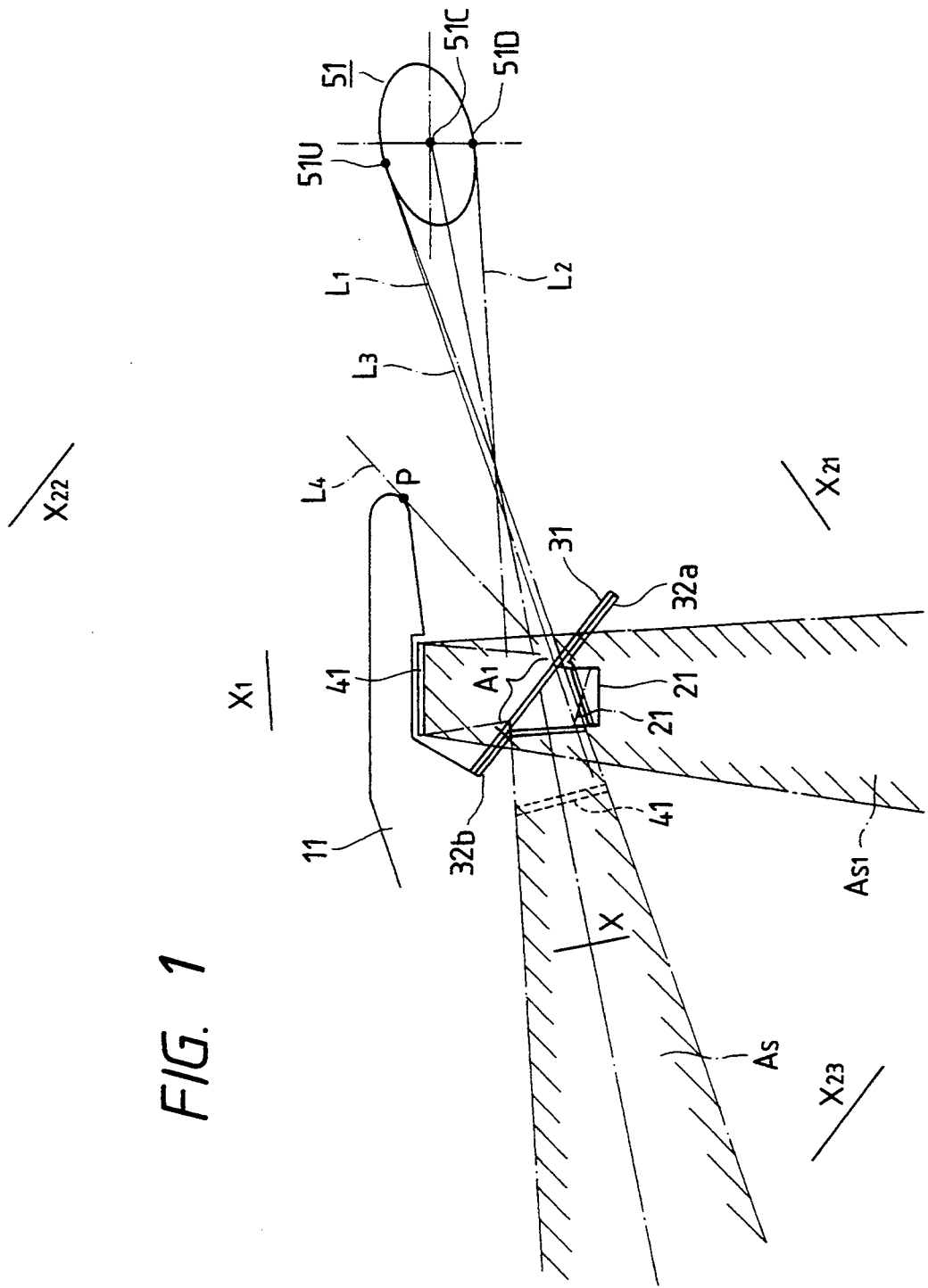
FIG. 1 is a schematic side view of a displaying apparatus for a vehicle in accordance with an embodiment of the present invention.
Figure 4:
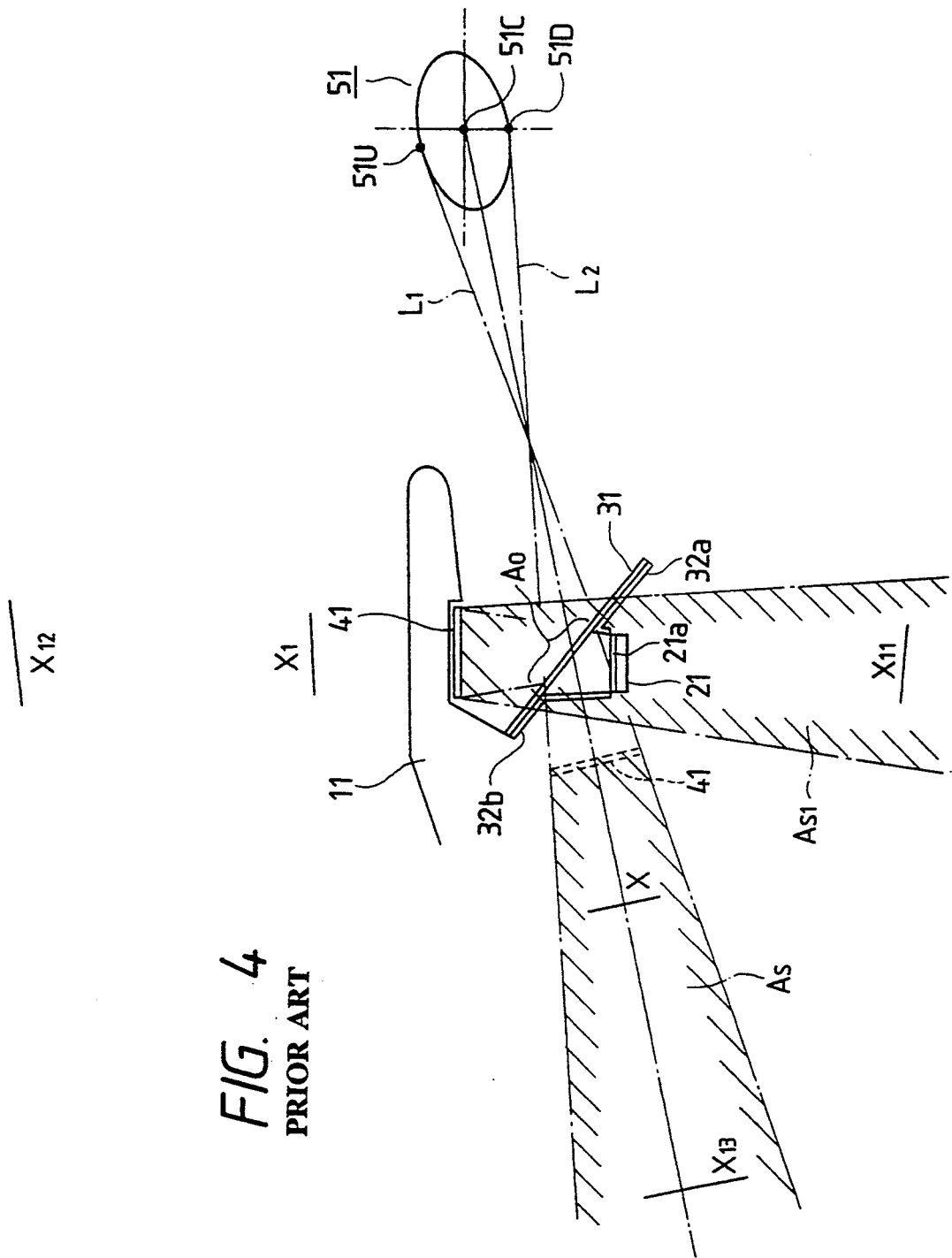
FIG. 4 is a schematic side view of a conventional displaying apparatus for a vehicle, particularly showing the structure of the conventional displaying apparatus.

FIG. 1 is a side view of a displaying apparatus for a vehicle in accordance with the embodiment of the present invention, schematically showing the structure of the displaying apparatus, and same or similar components as those shown in FIG. 4 are designated by same reference numeral without repeated description.

Reference character $L_3$ designates a third line. The third line $L_3$ extends between an upper limit 51U of an eye range 51 and a lower side of a range $A_1$ for directing display light meas of a displaying unit 21 to a second reflective plate 41.

Reference character $L_4$ designates a fourth line. The fourth line $L_4$ extend between a position P on the front lower side of a meter hood portion 11 and a lower side of the range $A_1$. As is apparent from the drawing, the fourth line $A_1$ extends tangential to the meter hood portion 11.

Reference characters $X_{21}$ to $X_{23}$ designate ghosts (virtual images) each of which appears in the presence of a surface glass 21a disposed on a displaying unit 21 for displaying displayed images X and $X_1$, a first reflective plate 31 and a second reflective plate 41.

Figure 2A:
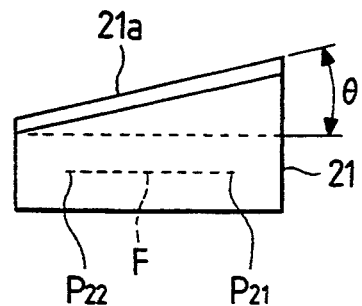
FIG. 2(a) is a side view of a displaying unit for the displaying apparatus.
Figure 2B:
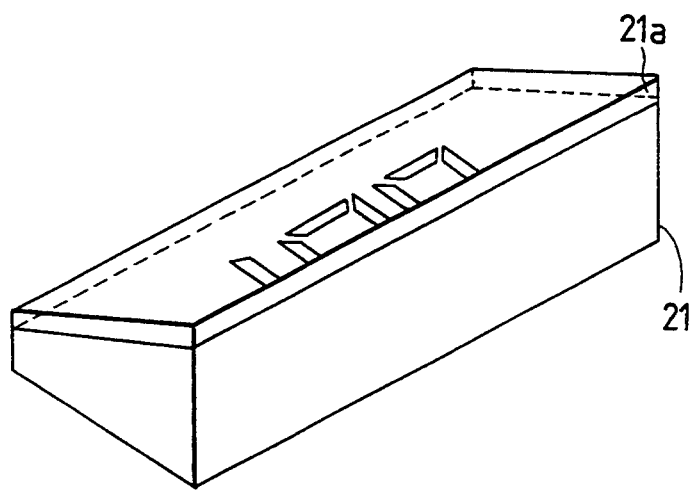
FIG. 2(b) is a perspective view of the displaying unit shown in FIG. 2(a)
Figure 5:
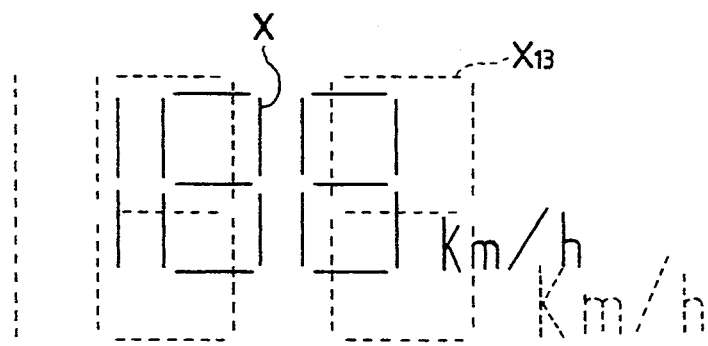
FIG. 5 is an illustrative view which shows a displayed image visually recognized in the visual recognizable area and a virtual image (ghost) with the conventional displaying apparatus.

FIG. 2(a) is a side view of the displaying unit 21 and FIG. 2(b) is a perspective view of the display unit 21.

Referring to FIG. 2, reference character F designates a displaying surface (light emitting surface), and reference character $\theta$ designates an angle defined by the displaying surface F and the surface glass 21a on the displaying unit 21. The angle $\theta$ is an angle which enables the ghost image $X_{23}$ to be located outside of a visually recognizable area $A_S$ as will be described later.

It should be noted that the displaying surface F extends in parallel with the second reflective plate 41 and the displaying unit 21 is arranged below the third line $L_3$.

Next, a mode of operation of the displaying apparatus constructed in the aforementioned manner will be described below.

First, displaying light beam emitted from the displaying unit 21 to visually represent a display image permeates through the first reflective plate 31, and thereafter, it is reflected at the second reflective plate 41.

The reflected light beam fully reflected from the second reflective plate 41 is reflected at the first reflective plate 31 again so as to allow it to be irradiated to an eye range 51.

Thus, when the first reflective plate 31 is seen from the eye range 51, the displayed image X is visually recognized as a ghost image in a visually recognizable area $A_S$ located behind the first reflective plate 31. Since the displayed image X is displayed at the remote position corresponding to the light beam path length within the range of the second reflective plate 41 which visually recognizably appears on the first reflective plate 31, displaying can be achieved with excellent visual recognizability.

At this time, a part of the displaying light reflected to the first reflective plate 31 from the second reflective plate 41 is irradiated to the surface glass 21a on the displaying unit 21 again via the first reflective plate 31, whereby the displayed image $X_1$ is reflected at the surface glass 21a to build a virtual image $X_{21}$.

Subsequently, the virtual image $X_{21}$ is reflected at the second reflective plate 41 in the enlarged state to build a virtual image $X_{22}$ which in turn is reflected at the first reflective plate 31 to build a virtual image $X_{23}$ which is located outside of the visual recognizable area $A_S$.

Thus, when a part of the displaying light beam reflected to the first reflective plate 31 from the second reflective plate 41 is irradiated to the surface glass 21a of the displaying unit 21 again via the first reflective plate 31, the virtual image $X_{23}$ (ghost) built by the displaying light beam is located outside of the visual recognizable area $A_S$. With such simple construction that the surface glass 21a is inclined in the above-described manner, the virtual image $X_{23}$ is not visually recognized within the visual recognizing area $A_S$ with the result that display quality of the displaced image X can be improved, and moreover, visual recognizability of the displaying apparatus can be improved (with improved optical contrast).

Due to the fact that the displaying unit 21 is disposed below the third line $L_3$, since the displaying unit 21 is not recognized when the first reflective plate 31 is seen from the eye range 51, the displaying unit 21 can be displaced in the upward direction within the range where the displaying unit 21 is not recognized from the eye range 51 by any means, resulting in the displaying apparatus being designed to build a small structure with reduced vertical dimensions.

To assure that the virtual image (ghost) $X_{23}$ is located outside of the visual recognizable area $A_S$, alternatively, the whole displaying unit 21 may be inclined relative to the second reflective plate 41 by an angle $\theta$. When the whole displaying unit 21 is inclined in that way, the displayed image X is also inclined by the same angle $\theta$ as represented by a one-dot chain line and a two-dot chain line. In this case, however, there arise malfunction that the height dimension of the displayed image X as seen from the eye range 51 is reduced, and moreover, the visually recognized angle is also reduced.

Figure 3:
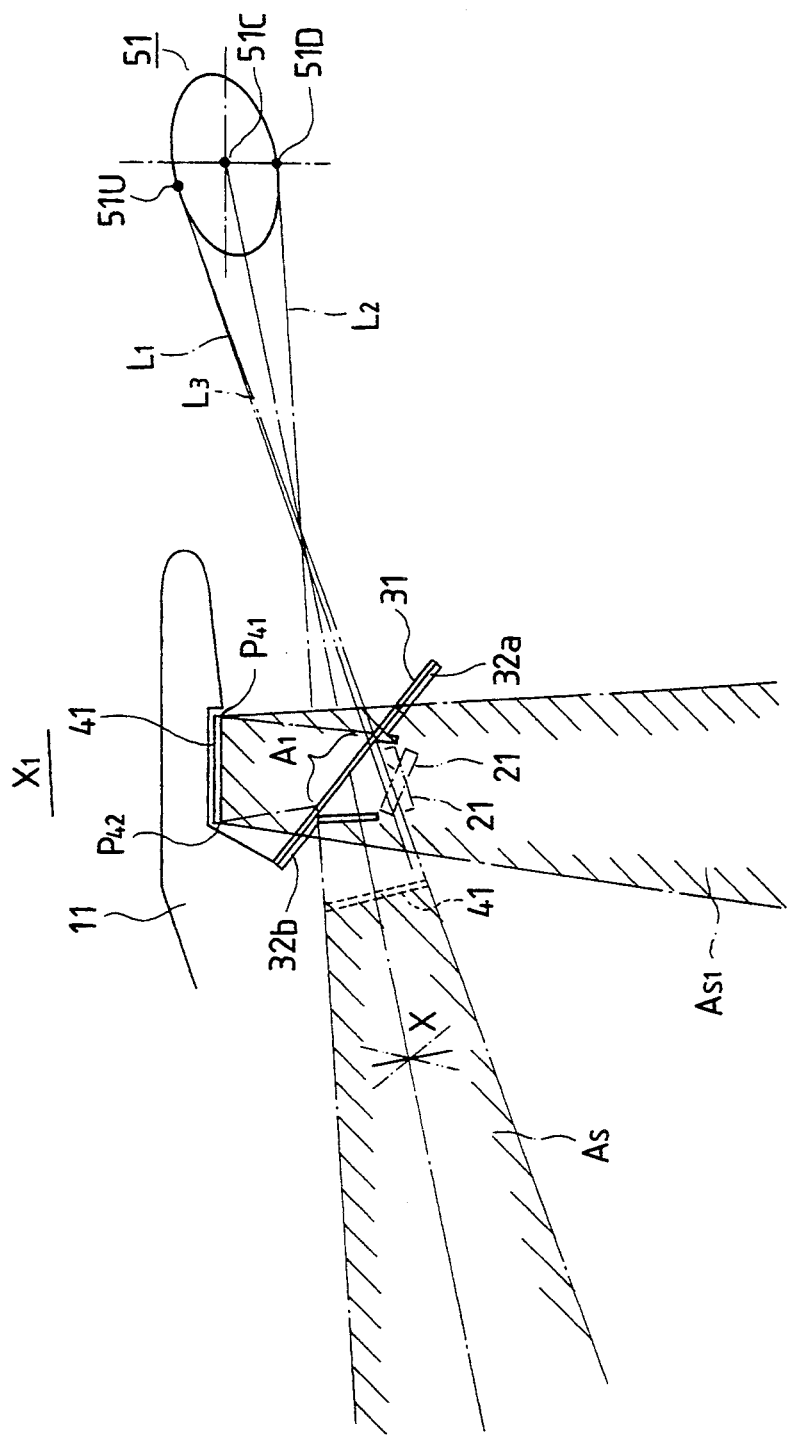
FIG. 3 is a schematic side view of the displaying apparatus, particularly showing a modified embodiment wherein the whole displaying unit is inclined so as to allow a virtual image in the form of a ghost to be located outside of a visual recognizable area.

When the whole displaying unit 21 is inclined by an angle $\theta$ relative to the second reflective plate 41, a distance (D1) between a position $P_{21}$ on the displaying unit 21 as shown in FIG. 2(a) (located on the right-hand side as seen in FIG. 3) and a position $P_{41}$ on the second reflective plate 41 differs from a distance (D2) between a position $P_{22}$ on the displaying unit 21 as shown in FIG. 2(a) (located on the left-hand side as seen in FIG. 3) and a position $P_{42}$ on the second reflective plate 41. Thus, there arises another malfunction that the displayed image X is distorted due to variation of the enlarging rate at each of the position $P_{21}$ and the position $P_{22}$.

Consequently, quality of the displayed image and visual recognizability of the displaying apparatus can not be improved.

The embodiment of the present invention has been described above with respect to an example wherein the virtual image$_{23}$ is built at the position located outside of the visual recognizable area $A_S$ and the displaying unit 21 can not be seen from the eye range 51. If it is acceptable that the displaying unit 21 is seen from the eye range 51, the virtual image $X_{23}$ can be built at the position located outside of the visual recognizable area $A_S$ by disposing the surface glass 21a in such a state that the surface glass 21a is inclined as represented by a two-dot chain line in FIG. 1.

In addition, the embodiment of the present invention has been described above with respect to an example wherein the light masking members 32a and 32b are arranged as shown in FIG. 1, FIG. 3 and FIG. 4. Alternatively, a coating layer having dark color, e.g., black color may be formed on a part of the first reflective plate 31 which is located outside of the range $A_1$.

Further, the embodiment of the present invention has been described above with respect to an example where the displaying unit 21 is disposed below the third line $L_3$. Alternatively, the displaying unit 21 may be disposed below a fourth line $L_4$ shown in FIG. 1. Also in this case, the displaying unit 21 can not be seen from the eye range 51 by any means.

As described above, according to one aspect of the present invention, the surface glass on the displaying unit is inclined in such a manner that a ghost identical with a displayed image built by the displaying light beam reflected from the second reflective plate after permeation of the same through the first reflective plate is located outside of the visual recognizable area defined by a first line extending between the upper limit of the eye range and the lower end of the second reflective plate appearing on the first reflective plate and a second line extending between the lower limit of the eye range and the upper end of the second reflective plate appearing on the first reflective plate. With this construction, any ghost identical with the displayed image can not visually be recognized in the visual recognizable area. Thus, advantageous effects of the present invention are that quality of the displayed image can be improved, and moreover, visual recognizability of the displaying apparatus can be improved (with improved optical contrast).

According to other aspect of the present invention, the displaying unit is disposed below a third line extending between the upper limit of the eye range and the lower side of the range where the first reflective plate allows the displaying light beam of the displaying unit to be directed to the second reflective plate. Thus, other advantageous effect is that the displaying unit can not be seen from the eye range by any means.

Since the displaying unit can be displaced in the upward direction within the range where the displaying unit can not be seen from the eye range by any means, another advantageous effect is that the displaying apparatus can be miniaturized with small dimensions as measured in the vertical direction.

What is claimed is:

1. A displaying apparatus for vehicle, comprising:
   display unit for displaying information, said display unit having a display surface from which the information is emitted as a light beam and a glass surface which is inclined with respect to said display surface;
   a first reflective plate having light permeability such that said light beam passes therethrough; and
   a second reflective plate at which said light beam is reflected as a reflected light beam, said reflected light beam being reflected to an eye range through said first reflective plate, wherein a virtual image of a displayed image of said displaying unit is recognized as a virtual image by observing said first reflection from said eye range, wherein said surface glass disposed on said displaying unit is inclined in such a manner that a first ghost image identical with said reflected light which is reflected on said surface glass through said first reflection plate and additional ghost images identical with said first ghost image reflected by said first and second reflective plates are positioned outside of a visual image area defined by a first line extending between an upper limit of said eye range and a lower end of said second reflective plate appearing on said first reflective plate, a second line extending between a lower limit of said eye range and an upper end of said second reflective plate appearing on said first reflective plate, and said second reflective plate appearing on said first reflective plate.

2. A displaying apparatus as claimed in claim 1, wherein light masking members are arranged on a surface of said first reflective plate confronted with said glass surface without a range where said light beam emitted from said displaying unit is directed to said second reflective plate.

3. A displaying apparatus as claimed in claim 2, wherein said surface glass disposed on said displaying unit is inclined in such a manner that a first ghost imaged identical with said reflected light which is reflected on said surface glass through said first reflection plate and additional ghost images identical with said first ghost image reflected by said first and second reflective plates are positioned outside of a visual image area defined by a first line extending between an upper limit of said eye range and a lower end of said second reflective plate appearing on said first reflective plate, a second line extending between a lower limit of said eye range and an upper end of said second reflective plate appearing on said first reflective plate, and said second reflective plate appearing on said first reflective plate.

4. A displaying apparatus as claimed in claim 3, wherein said display unit is arranged below a third line extending between said upper limit of said eye range and a lower side of said range where said light beam emitted from said displaying unit is directed to said second reflective plate.

* * * * *